April 4, 1967   R. W. BENNETT   3,312,310
BRAKE MECHANISM AND SHOE GUIDE AND BEARING MEANS THEREFOR
Filed May 12, 1965
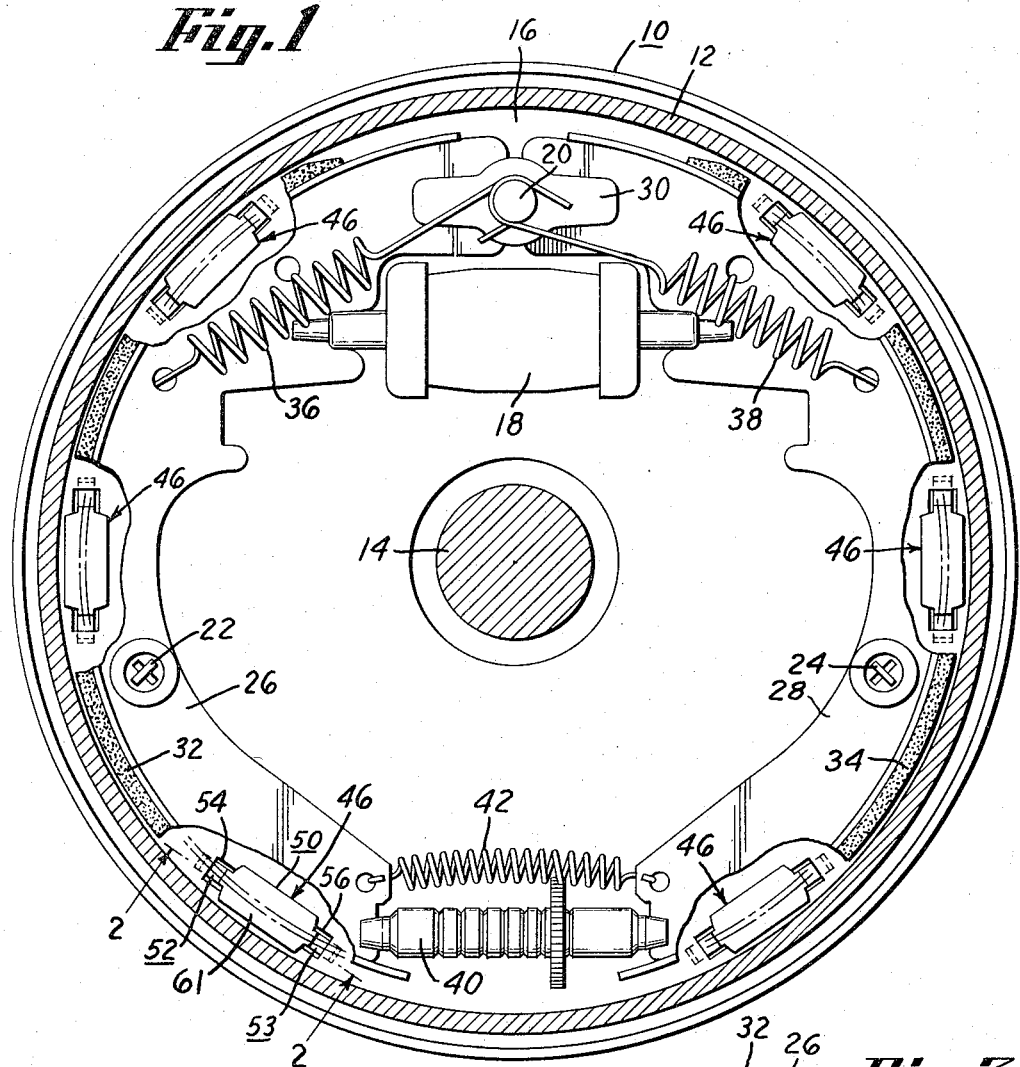
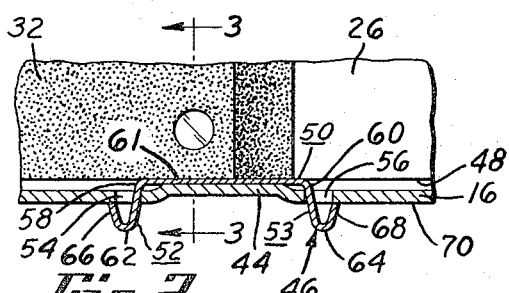
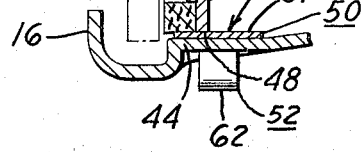
INVENTOR.
RONALD W. BENNETT
BY D. D. McGraw
ATTORNEY United States Patent Office 3,312,310
Patented Apr. 4, 1967

3,312,310
BRAKE MECHANISM AND SHOE GUIDE AND
BEARING MEANS THEREFOR
Ronald W. Bennett, Dayton, Ohio, assignor to General Motors Corporation, Detroit, Mich., a corporation of Delaware
Filed May 12, 1965, Ser. No. 455,223
5 Claims. (Cl. 188—78)

The invention relates to a brake mechanism and more particularly to brake mechanism of the drum brake type having movable shoes flexibly mounted on a backing plate and guided by guide and bearing surfaces on the backing plate as the shoes move into and out of braking engagement with a brake drum. It more particularly relates to the provision of replaceable brake shoe guide and bearing pads which are engaged by the edge of each brake shoe. Such pads are preferably provided as snap-on clips at each of the areas on the backing plate where a brake shoe is guided and bears. It has been common practice in the manufacture of drum brakes to provide embossed surfaces on brake shoe backing plates against which the edges of the brake shoes rub in their apply and release movements so that the shoes are kept in alignment and also guided. Such surfaces tend to become scuffed with use, thereby increasing the friction forces between the shoes and the backing plate. Since several guide and bearing surfaces are usually provided for each shoe, and such surfaces may not become scuffed at the same rate, different drag forces may occur on a shoe. In addition to providing unnecessary drag force which must be overcome, the uneven application of such drag force on the shoe will adversely affect brake performance and will become worse with continued brake usage. In extreme instances brakes may even be prevented from being satisfactorily applied.

It is now proposed to provide suitable brake shoe guide and bearing surfaces on the backing plate which may be replaced each time the brake lining is renewed, with the replacement requiring a minimum time and expense. In the preferred embodiment of the invention the guide and bearing surfaces are provided by forming replaceable pads of a stainless or spring steel or other suitable long wearing rust and wear resistant material. The pads may be utilized in brake mechanisms currently produced by providing suitable apertures in the backing plate for mounting the pads thereon. The pads may be mounted directly over the bosses currently provided. The pads are preferably generally rectangular in the center sections thereof and of sufficient width to be engaged by the edge of the cooperating shoe during all conditions of shoe movement, whether the shoe lining be new or worn and whether the shoe be released or applied. The preferred pad construction also utilizes ends on opposite sides of the rectangular center section which are bent away from the guide and bearing surface and then reversely bent toward that surface so that these ends may extend through apertures in the backing plate and snap outwardly to lock the pads to the backing plate. The pads are preferably installed by utilizing in each instance a pair of apertures in substantial arcuate alignment with the edge of the associated brake shoe. Since in the usual drum brake construction three guide bosses are provided on the backing plate for each shoe, it is preferable to utilize three pads each fastened to the backing plate through a pair of apertures disposed on opposite sides of a boss.

In the drawing:
FIGURE 1 is an elevation view with parts broken away and in section of a drum brake assembly embodying the invention.
FIGURE 2 is a partial section view taken in the direction of arrows 2—2 of FIGURE 1.
FIGURE 3 is a partial section view taken in the direction of arrows 3—3 of FIGURE 2.

The brake assembly 10 includes a brake drum 12 suitably mounted on an axle 14. The brake backing plate 16 is mounted to a non-rotatable part of the vehicle and provides a mount for the wheel cylinder 18, the anchor pin 20 and the shoe hold-down spring assemblies 22 and 24. The brake shoes 26 and 28 are movably secured to the backing plate 16 by the hold-down spring assemblies and by the anchor pin guide plate 30. The shoes 26 and 28 are respectively provided with linings 32 and 34 which are movable into and out of engagement with the brake drum 12 for braking action. Pressurization of the wheel cylinder 18 provides the force which moves the shoes. Retracting springs 36 and 38 are secured to the anchor pin 20 and to the shoes 26 and 28 so that they retract the shoes when the pressure is released in the wheel cylinder 18. Since the brake assembly illustrated is of the duo-servo type, an adjuster link 40 is provided between the ends of the brake shoe opposite the anchor pin 20, as is a holding spring 42. The usual backing plate is provided with bosses 44, better shown in FIGURES 2 and 3, which act as brake shoe guide and bearing bosses. In providing structure embodying the invention, brake shoe guide and bearing pads 46 are mounted on the backing plate. While it is not necessary to utilize a backing plate having such bosses 44, the invention may be utilized with a standard type production backing plate which does have such bosses. Six such pads 46 are provided, three pads for each shoe. One pad is provided at the upper end of each shoe, one pad centrally of each shoe, and one pad at the lower end of each shoe. The shoes 26 and 28 have web edges 48 immediately adjacent the backing plate which engage the guide and bearing surfaces of the pads.

Since all of the pads are similarly constructed only one pad will be referred to for further detailed description. The pad is constructed with a flat center section 50 and ends 52 and 53. Center section 50 is preferably substantially rectangular and wider than the ends 52 and 53 and must be of sufficient width to remain in engagement with the edge 48 of the shoe in the extreme radial position of the shoe. Thus when a new lining 32 is provided and the shoe 26 is in the released position, as shown in FIGURE 1, the shoe edge 48 is in full guiding and bearing engagement with the guide and bearing surface of center section 50. On the other hand, when the lining 32 is worn to the point where it requires replacement, and the shoe is engaged with the drum 12, the width of center section 50 is still sufficient to provide full guide and bearing engagement with the edge 48 of the shoe. A pair of apertures 54 and 56 are provided in substantial arcuate alignment with the shoe edge 48 so that the pad 46 is mounted in alignment with the shoe edge. Since a series of pads is provided, a like series of pairs of apertures is also provided. When the bosses 44 are formed on the backing plate, each pair of apertures is positioned on opposite sides of the associated boss. The ends 52 and 53 provide mounting or locking means for the pads. The preferred construction has the pad ends bent at 58 and 60 away from the guide and bearing surface 61 so that the ends extend through the apertures 54 and 56. The ends are then reversely bent at 62 and 64 and terminate in locking tabs 66 and 68 which terminate short of the plane of the guiding and bearing surfaces 61 a sufficient amount so that when the ends are inserted through the apertures the locking tabs 66 and 68 snap outwardly and engage the back side 70 of the backing plate. Thus the tabs may be readily snapped in place and may also be readily removed. It is preferred that the old pads be removed and replaced with new pads when the brake linings are renewed.

While many different materials may be utilized, the pads are preferably formed of stainless or spring steel or other similar rust and wear resistant material. The material must be able to withstand the heat generated during braking action. It is preferred that the pad center sections be relatively thin so that they do not adversely affect the position of the shoes relative to the remainder of the brake assembly.

What is claimed is:

1. In a brake having a backing plate and a brake drum and a brake shoe mounted on said backing plate and means for moving said brake shoe into and out of braking engagement with said drum, the improvement comprising a plurality of pairs of apertures in said backing plate in substantial arcuate alignment with the edge of said shoe which is immediately adjacent said backing plate, and a plurality of replaceable unitary shoe guide and bearing pads each having a shoe edge-engaging guide and bearing surface extending between a pair of said apertures and further having reversely bent ends extending through said pairs of apertures and removably snap locking said pad to said backing plate.

2. The improvement of claim 1, each of said pad guide and bearing surfaces being a substantially rectangular pad center section having a width aligned radially of said backing plate greater than the difference between the maximum and minimum radial travel of said shoe at each of said plurality of pads when said shoe is newly lined and released and when said shoe is worn and applied to said drum.

3. In a brake having a backing plate and a brake drum and a brake shoe mounted on said backing plate and means for moving said brake shoe into and out of braking engagement with said drum, the improvement comprising a series of pairs of apertures in said backing plate in substantial arcuate alignment with the edge of said shoe which is immediately adjacent said backing plate, a like series of raised bosses formed on said backing plate each between adjacent apertures making up a pair of said series of pairs of apertures, and a like series of replaceable shoe guide and bearing pads each having a shoe edge-engaging guide and bearing surface extending between the two apertures of each of said pairs of apertures and engaging and covering each of said raised bosses, said pads further having reversely bent tab locking means extending into the two apertures of each of said pairs of apertures and engaging the back side of said backing plate and locking said pads to said backing plate.

4. In a brake having a backing plate and a brake drum and a brake shoe mounted on said backing plate and means for moving said brake shoe into and out of braking engagement with said drum, the improvement comprising a plurality of raised bosses formed on said backing plate, a pair of apertures in said backing plate on opposite sides of each of said bosses and in arcuate alignment with the edge of said shoe which is immediately adjacent said backing plate, and replaceable unitary shoe guide and bearing pads each having a shoe edge-engaging guide and bearing center section extending between a pair of said apertures over respective ones of said bosses and each further having reversely bent spring attaching ends extending through said apertures engaging the back side of said backing plate in spaced relation to said apertures and locking said pad to said backing plate.

5. A guide and bearing pad for a brake shoe comprising a substantially rectangular flat center section having a shoe guide and bearing surface and first and second end mounting sections extending from opposed sides of said substantially rectangular flat center section first in a direction away from the plane of said shoe guide and bearing surface and then reversely bent to provide locking tabs terminating short of said guide and bearing surface engaging the back side of a brake backing plate for mounting said pad on the brake backing plate.

References Cited by the Examiner
UNITED STATES PATENTS

| | | | |
|---|---|---|---|
| 1,737,375 | 11/1929 | King | 40—20 |
| 2,122,296 | 6/1938 | Russell | 188—78 |
| 2,122,919 | 7/1938 | Preston | 40—20 |
| 2,389,311 | 11/1945 | Hirschman et al. | 188—78 |
| 2,745,516 | 5/1956 | Smith | 188—206 X |

MILTON BUCHLER, *Primary Examiner.*

B. S. MOWRY, *Assistant Examiner.*